United States Patent
Kamoi et al.

(10) Patent No.: US 10,678,231 B2
(45) Date of Patent: Jun. 9, 2020

(54) PRODUCTION CONTROLLER EQUIPPED WITH FUNCTION OF IDENTIFYING CAUSE UPON OPERATION STOP OF PRODUCTION FACILITY INCLUDING MANUFACTURING FACILITIES

(71) Applicant: FANUC CORPORATION, Yamanashi (JP)

(72) Inventors: Toshiaki Kamoi, Yamanashi (JP); Hiromitsu Takahashi, Yamanashi (JP); Tomoyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 297 days.

(21) Appl. No.: 15/684,403

(22) Filed: Aug. 23, 2017

(65) Prior Publication Data
US 2018/0059657 A1  Mar. 1, 2018

(30) Foreign Application Priority Data

Aug. 29, 2016  (JP) .................................. 2016-167074

(51) Int. Cl.
*G05B 19/418*  (2006.01)
*G05B 23/02*  (2006.01)
*G05B 19/41*  (2006.01)

(52) U.S. Cl.
CPC ....... *G05B 23/0275* (2013.01); *G05B 19/418* (2013.01); *Y02P 90/18* (2015.11)

(58) Field of Classification Search
CPC .... G05B 23/0275; G05B 19/418; Y02P 90/18
See application file for complete search history.

(56) References Cited

U.S. PATENT DOCUMENTS

| 2003/0014699 A1* | 1/2003 | Kallela | G05B 19/41875 |
| | | | 714/47.3 |
| 2010/0217437 A1* | 8/2010 | Sarh | B25J 9/0084 |
| | | | 700/248 |
| 2011/0166703 A1* | 7/2011 | Byrne | B25J 9/1682 |
| | | | 700/246 |

(Continued)

FOREIGN PATENT DOCUMENTS

| JP | S61-105616 A | 5/1986 |
| JP | 3-59703 A | 3/1991 |

(Continued)

*Primary Examiner* — Rocio Del Mar Perez-Velez
*Assistant Examiner* — Brian T McMenemy
(74) *Attorney, Agent, or Firm* — Hauptman Ham, LLP

(57) ABSTRACT

A cell controller includes a first communication unit which receives a task program and signal setting information stored in each manufacturing machine from this manufacturing machine, a stop detection unit which refers to the task program and the signal setting information to detect whether a production facility has stopped operation, and a stop cause identification unit which analyzes the task program and the signal setting information to identify the manufacturing machine that has caused the operation stop of the production facility, and this cause. Such a cell controller can detect whether a production facility including manufacturing machines has stopped operation, and automatically identify the manufacturing machine that has caused this operation stop, and this cause.

6 Claims, 3 Drawing Sheets

(56) References Cited

U.S. PATENT DOCUMENTS

2014/0336795 A1* 11/2014 Asenjo ............... G05B 19/4083
  700/86
2015/0097412 A1* 4/2015 Smith ..................... E21C 41/16
  299/1.05

FOREIGN PATENT DOCUMENTS

| JP | H5-200657 A | 8/1993 |
| JP | 9-69007 A | 3/1997 |
| JP | 2005-243008 A | 9/2005 |

* cited by examiner

PRODUCTION CONTROLLER EQUIPPED WITH FUNCTION OF IDENTIFYING CAUSE UPON OPERATION STOP OF PRODUCTION FACILITY INCLUDING MANUFACTURING FACILITIES

RELATED APPLICATIONS

The present application claims priority to Japanese Patent Application No. 2016-167074 filed Aug. 29, 2016, the disclosure of which is hereby incorporated by reference herein in its entirety.

BACKGROUND OF THE INVENTION

1. Field of the Invention

The present invention relates to a production controller which produces an article by controlling manufacturing machines forming a production facility.

2. Description of the Related Art

In production plants, production facilities according to the line production scheme or the cell production scheme, i.e., production lines or manufacturing cells are formed by appropriately arranging manufacturing machines such as machine tools or robots. For each production facility, different manufacturing machines are used to perform tasks such as assembly, machining, and welding. The manufacturing machines forming each such production facility operate in response to manufacturing instructions from a common production controller connected via a communication device. The production controller manages, e.g., the manufacturing processes, product quality, and safety while acquiring information such as the states or the production volumes of the manufacturing machines from each production facility.

In such production facilities, any production facility may stop operation due to an abnormality in at least one of the manufacturing machines. In this case, the manufacturing machines may be preferably restored quickly by identifying the cause of the abnormality. In this respect, a method has been proposed for detecting the manufacturing machine having the abnormality from the manufacturing machines in the production facility.

Japanese Unexamined Patent Publication (Kokai) No. H09-069007, for example, discloses a control system which can simultaneously slowly reproduce robots to facilitate operations for correcting information stored in memory in the form of a program, such as the order, the condition, and the position, by operations for teaching the robots.

Japanese Unexamined Patent Publication (Kokai) No. H03-059703 discloses a fault diagnostic device which diagnoses a fault of a sequence controller which controls, e.g., a plant or a device system.

In a production facility such as a production line or a manufacturing cell including manufacturing machines, an article is generally produced by tasks mutually related between the respective manufacturing machines. When the overall production facility stops operation, the operation stop may be caused as one of the manufacturing machines forming this production facility is inactive because of waiting for a signal from another manufacturing machine. In other words, even when one manufacturing machine is not actually in operation, another manufacturing machine may be the real cause of the operation stop.

Under such circumstances, when a production facility including manufacturing machines stops operation, it is difficult to identify the manufacturing machine that has caused the operation stop of the production facility, and the cause of the operation stop. Further, identifying the cause of the operation stop may involve a large number of processes.

Japanese Unexamined Patent Publication (Kokai) No. H09-069007, described earlier, discloses only a technique for facilitating correction of a control program for each robot by allowing simultaneous slow reproduction of robots. This technique is intended not to automatically detect a robot having an abnormality from the robots, and the cause of the abnormality, but to determine whether each robot operation has an abnormality by the operator himself or herself and identify the cause of the abnormality by the operator himself or herself as well.

Japanese Unexamined Patent Publication (Kokai) No. H03-059703, described earlier, discloses only a technique for detecting an abnormality for each check point in a sequence controller which controls one controlled object of, e.g., a plant or a device system. This technique is not intended to identify, in a production facility including manufacturing machines, the manufacturing machine in the production facility that has caused the operation stop of the production facility, and the cause of the operation stop.

SUMMARY OF INVENTION

The present invention provides a production controller which can detect whether a production facility including manufacturing machines has stopped operation, and automatically identify the manufacturing machine that has caused the operation stop, and this cause.

According to a first aspect of the present disclosure, provided is a production controller which produces an article by controlling manufacturing machines forming a production facility, in accordance with production planning made by a production management system, each of the manufacturing machines storing at least a task program including a command for a task operation mutually related between the manufacturing machines and storing setting information of a signal exchanged between the manufacturing machines as input and output in the task operation, and the production controller including:

a first communication unit which is configured to exchange arbitrary information with each of the manufacturing machines via a first communication network and receives the task program and the setting information of the signal stored in each of the manufacturing machines from each of the manufacturing machines;

a stop detection unit which refers to the task program and the setting information of the signal received from each of the manufacturing machines to detect whether the production facility has stopped operation; and a stop cause identification unit which analyzes the task program and the setting information of the signal received from each of the manufacturing machines to identify the manufacturing machine that has caused an operation stop of the production facility, and the cause.

According to a second aspect of the present disclosure, provided is the production controller according to the first aspect, wherein the stop detection unit is configured to execute a stop detection algorithm for referring to the task program and the setting information of the signal for at least one manufacturing machine of the manufacturing machines when the at least one manufacturing machine has been stopped for not less than a predetermined time, to determine whether the at least one manufacturing machine has been stopped to wait for a signal from another manufacturing machine of the manufacturing machines, and determining that the production facility has stopped operation when it is determined that the at least one manufacturing machine has been stopped for not less than the predetermined time to wait for the signal, and the stop cause identification unit is configured to execute a stop cause identification algorithm for analyzing the task program and the setting information of the signal received from each of the manufacturing machines when the stop detection unit determines that the production facility has stopped operation, to identify the manufacturing machine that has caused an operation stop of the production facility, and the cause.

According to a third aspect of the present disclosure, provided is the production controller according to the first aspect, wherein the stop detection unit is configured to execute a stop detection algorithm for referring to the task program and the setting information of the signal for a first manufacturing machine of the manufacturing machines when the first manufacturing machine has been stopped for not less than a predetermined time, to determine whether the first manufacturing machine has been stopped to wait for a signal from another manufacturing machine of the manufacturing machines, and determining that the production facility has stopped operation when it is determined that the first manufacturing machine has been stopped for not less than the predetermined time to wait for the signal, and the stop cause identification unit is configured to execute a stop cause identification algorithm for analyzing the task program and the setting information of the signal for the first manufacturing machine when the stop detection unit determines that the production facility has stopped operation, to identify a second manufacturing machine serving as another manufacturing machine of the manufacturing machines that outputs a signal to be input to the first manufacturing machine, and analyzing the task program and the setting information of the signal for the second manufacturing machine to identify a cause due to which the second manufacturing machine outputs no signal.

According to a fourth aspect of the present disclosure, provided is the production controller according to the third aspect, wherein the stop cause identification algorithm repeats analyzing the task program and the setting information of the signal for the second manufacturing machine waiting for a signal when the cause due to which the second manufacturing machine outputs no signal is waiting for the signal, to identify another manufacturing machine of the manufacturing machines that outputs a signal to be input to the second manufacturing machine waiting for the signal, and analyzing the task program and the setting information of the signal for the other manufacturing machine to identify a cause due to which the other manufacturing machine outputs no signal.

According to a fifth aspect of the present disclosure, provided is the production controller according to any one of the second to fourth aspects, wherein the production management system includes a storage unit which stores the stop detection algorithm and the stop cause identification algorithm, and the production controller further includes a second communication unit which is configured to exchange arbitrary information with the production management system via a second communication network and receives the stop detection algorithm and the stop cause identification algorithm stored in the storage unit from the production management system via the second communication network.

BRIEF DESCRIPTION OF THE DRAWINGS

The above or other objects, features, and advantages of the present invention will become more apparent from the detailed description of a typical embodiment of the present disclosure illustrated in the accompanying drawings, in which.

DETAILED DESCRIPTION

Figure 1:
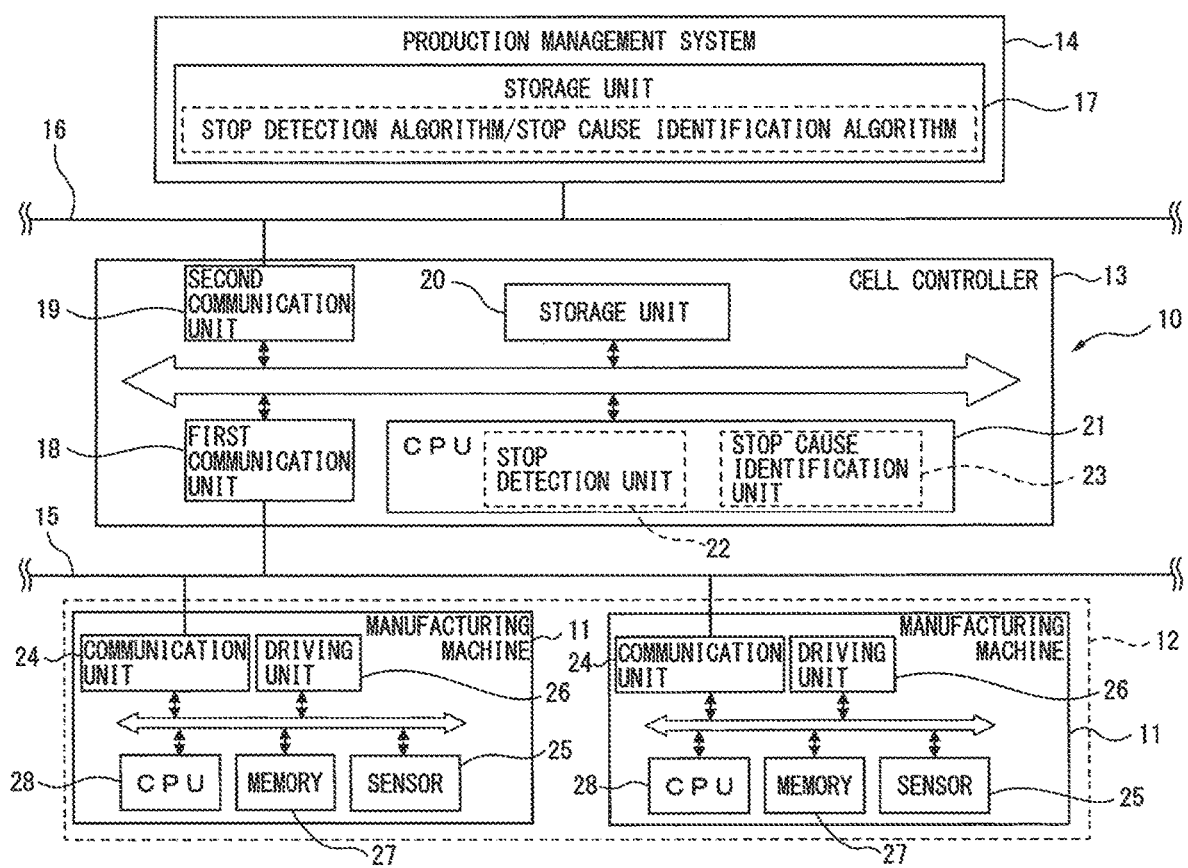
FIG. 1 is a block diagram schematically illustrating a production system including a production controller according to an embodiment.

An embodiment of the present disclosure will be described below with reference to the drawings. In the drawings to be referred to, the same reference numerals denote the same constituent or functional parts. To facilitate understanding, these drawings use different scales as appropriate. Further, the modes illustrated in the drawings are merely examples for carrying out the present invention, which is not limited to the modes illustrated in the drawings.

FIG. 1 is a block diagram schematically illustrating a production system 10 including a cell controller (production controller) 13 according to an embodiment.

The production system 10 according to the present embodiment illustrated as FIG. 1 serves as a system which produces an article using at least one manufacturing cell 12 including manufacturing machines 11.

The production system 10 according to the present embodiment includes a cell controller (production controller) 13 which produces an article by controlling the manufacturing machines 11 forming each manufacturing cell 12, and a production management system 14 communicatively connected to the cell controller 13.

The production management system 14 serves as a device, such as an MES (Manufacturing Execution System), which makes production planning for producing an article using the manufacturing cell 12 and manages the state of production by the manufacturing machines 11 in the manufacturing cell 12. The cell controller 13 receives the production planning from the production management system 14, and generates manufacturing instructions to each manufacturing machine 11 in the manufacturing cell 12 and gives them to this manufacturing machine 11 in accordance with the production planning. The cell controller 13 receives information such as the state variable, the operation state, and the actual production performance from each manufacturing machine 11 given the manufacturing instructions, performs predetermined processing, and sends them to the production management system 14.

The manufacturing cell 12 serves as a production facility of the cell production scheme in which manufacturing machines 11 are combined flexibly. Instead of the manufacturing cell 12, a production facility of the line production scheme in which manufacturing machines 11 are arranged linearly, i.e., a production line may be applied to the production system 10. Although the manufacturing cell 12 is formed by two manufacturing machines 11 in FIG. 1, neither the number of production facilities such as manufacturing cells 12 or production lines nor the number of manufacturing machines forming each production facility is limited in the present invention.

The production facility such as the manufacturing cell 12 or the production line is not limited to that formed by manufacturing machines of one type alone. Such a production facility may be formed by different manufacturing machines such as industrial robots, NC machine tools, and PLCs (Programmable Logic Controllers). In addition, testers, presses, printing presses, die-cast machines, injection molding machines, food machines, packers, welding machines, cleaning machines, coaters, assembly devices, mounters, woodworkers, sealers, or cutters, for example, may be used as manufacturing machines for forming such a production facility.

The manufacturing cell 12 is located in, e.g., a production plant which produces an article. The manufacturing cell 12 may be located across production plants in a set of buildings. In contrast to this, the cell controller 13 may be located in a building different from the production plant. In this case, the cell controller 13 and each manufacturing machine 11 in the manufacturing cell 12 are preferably communicatively connected to each other via a communication network 15 such as an intranet or a LAN.

The production management system 14 may also serve as a host computer (not illustrated) located in, e.g., an office remote from the production plant. In this case, the host computer is implemented in a computer on a cloud such as a cloud server, and the host computer and the cell controller 13 are preferably communicatively connected to each other via a communication network 16 such as the Internet.

The production management system 14 according to the present embodiment is implemented in a computer on a cloud, including a storage unit 17 such as a database, as illustrated as FIG. 1. The storage unit 17 stores, in advance, an algorithm for detecting the operation stop of the manufacturing cell 12 (to be referred to as a stop detection algorithm hereinafter) and an algorithm for identifying the cause of the operation stop of the manufacturing cell 12 (to be referred to as a stop cause identification algorithm hereinafter).

The above-mentioned algorithms are preferably transmitted from the production management system 14 to the cell controller 13 in accordance with instructions from the cell controller 13. Further, an input device (not illustrated) from which each of the above-mentioned algorithms is input to the storage unit 17 is preferably connected to the production management system 14. The input device is, e.g., a keyboard or a touch panel and can not only be used for inputting data but also deleting and rewriting data.

Each of the manufacturing machine 11, the cell controller 13, and the production management system 14 is implemented using a computer system including, e.g., a storage unit, a CPU (control processing unit), and a communication unit connected to each other via buses, as illustrated as FIG. 1. Examples of the storage unit may include ROM (read only memory) and RAM (random access memory).

The functions and operations of the manufacturing machine 11, the cell controller 13, and the production management system 14, as will be described later, are achieved by causing the CPU to execute programs stored in the ROM provided in them. For example, a driving unit 26 such as a motor provided in each manufacturing machine 11 operates in accordance with a program executed by a CPU 28.

The configuration of the cell controller 13 will be described in more detail below.

The cell controller 13 according to the present embodiment includes a first communication unit 18, a second communication unit 19, a storage unit 20, and a CPU 21 which controls these units, as illustrated as FIG. 1. The CPU 21 may function as a stop detection unit 22 and a stop cause identification unit 23.

The first communication unit 18 is configured to exchange arbitrary information with a communication unit 24 of each manufacturing machine 11 in the manufacturing cell 12 via the first communication network 15. For example, the first communication unit 18 transmits manufacturing instructions based on production planning from the production management system 14 to the communication unit 24 of each manufacturing machine 11 in the manufacturing cell 12 via the first communication network 15. The first communication unit 18 receives the state variables of each manufacturing machine 11 from this manufacturing machine 11 in the manufacturing cell 12, such as the position, the speed, and the torque of the driving unit 26 such as a motor detected by a sensor 25.

The first communication unit 18 further receives information such as the operation state and the actual production performance from each manufacturing machine 11, and a task program and signal setting information stored in memory 27 of each manufacturing machine 11.

The above-mentioned task program is stored in the memory 27 of each manufacturing machine 11 and includes commands for task operations mutually related between the manufacturing machines 11.

For example, the task program includes commands which may be involved in each manufacturing machine 11 to perform a certain task by sequentially operating the manufacturing machines 11. When the manufacturing machine 11 serves as, e.g., a multi-articulated robot, the task program includes, e.g., an operation command for moving its arm to the task position, a command for notifying another manufacturing machine 11 of an arbitrary signal, and a command for reading the state of an arbitrary signal in another manufacturing machine 11.

The above-mentioned signal setting information is stored in the memory 27 of each manufacturing machine 11 and is for signals exchanged between the manufacturing machines 11 as input and output in task operations mutually related between the manufacturing machines 11. For example, information concerning input and output setting of signals for starting or ending a task program of each manufacturing machine 11 to perform a certain task by sequentially operating the manufacturing machines 11 is stored in the memory 27 of each manufacturing machine 11. As for, e.g., input/output signals (I/O signals) exchanged between industrial robots and the cell controller 13 via fieldbus communication, a robot to be operated in response to an output signal or an input signal generated by another robot, and the other robot are set.

The above-mentioned task program and signal setting information are merely examples, and the present invention is not limited to such specific examples, as a matter of course.

The second communication unit 19 is configured to exchange arbitrary information with the production management system 14 via the second communication network 16. The second communication unit 19 receives, e.g., production planning from the production management system 14 via the second communication network 16. The second communication unit 19 can further receive the above-mentioned stop detection algorithm and stop cause identification algorithm stored in the storage unit 17 of the production management system 14 from the production management system 14 via the second communication network 16.

The cell controller 13 can use the CPU 21 to determine the manufacturing machine 11 that is currently stopped, from information such as the above-mentioned state variables or the operation state and the actual production performance transmitted from each manufacturing machine 11. When the cell controller 13 determines that at least one of the manufacturing machines 11 has been stopped for a predetermined time or more, it instructs the manufacturing machine 11 at a stop to transmit the task program and the signal setting information in the memory 27 of this manufacturing machine 11 to the first communication unit 18. With this operation, the cell controller 13 further instructs the production management system 14 to transmit the above-mentioned stop detection algorithm and stop cause identification algorithm to the second communication unit 19.

The storage unit 20 of the cell controller 13 can store, e.g., the task program and the signal setting information of each manufacturing machine 11 received by the first communication unit 18, and the above-mentioned stop detection algorithm and stop cause identification algorithm received by the second communication unit 19. The storage unit 20 includes ROM and RAM.

The ROM stores, e.g., a communication control program for controlling communication between the cell controller 13 and each manufacturing machine 11 and the production management system 14, and a command generation program for generating operation commands to operate each manufacturing machine 11 of the manufacturing cell 12 in accordance with a production planning instruction from the production management system 14. The RAM temporarily stores, e.g., the task program and the signal setting information of each manufacturing machine 11, the stop detection algorithm, and the stop cause identification algorithm, and has a storage capacity sufficient to cause the CPU 21 to execute arithmetic operations in accordance with these algorithms. The CPU 21 functions as the stop detection unit 22 and the stop cause identification unit 23 (to be described later) by reading and executing the stop detection algorithm and the stop cause identification algorithm in the RAM.

Although the cell controller 13 according to the present embodiment receives the above-mentioned stop detection algorithm and stop cause identification algorithm from the production management system 14, the present invention is not limited to this. At least one of the stop detection algorithm and the stop cause identification algorithm may be stored in the storage unit 20 of the cell controller 13 in advance.

The stop detection unit 22 refers to the task program and the signal setting information received from each manufacturing machine 11 to detect whether the manufacturing cell 12 has stopped operation. More specifically, the stop detection unit 22 executes the above-mentioned stop detection algorithm when at least one manufacturing machine 11 has been stopped. This stop detection algorithm refers to the task program and the signal setting information for the manufacturing machine 11 at a stop to detect whether the manufacturing cell 12 has stopped operation. In other words, the stop detection unit 22 detects whether the stopped state of the manufacturing machine 11 causes the operation stop of the overall manufacturing cell 12.

The stop cause identification unit 23 analyzes the task program and the signal setting information received from each manufacturing machine 11 to identify the manufacturing machine 11 that has caused the operation stop of the manufacturing cell 12, and this cause. More specifically, the stop cause identification unit 23 executes the above-mentioned stop cause identification algorithm. This stop cause identification algorithm analyzes the task program and the signal setting information received from each manufacturing machine 11 when the stop detection unit 22 detects the operation stop of the manufacturing cell 12, to identify the manufacturing machine that has caused the operation stop of the manufacturing cell 12, and this cause.

The above-mentioned stop detection algorithm preferably further includes, e.g., the procedure of, when at least one manufacturing machine 11 has been stopped for a predetermined time or more, referring to the task program and the signal setting information for this manufacturing machine 11 at a stop to determine whether this manufacturing machine 11 at a stop has been stopped to wait for a signal from another manufacturing machine 11. This stop detection algorithm preferably further includes the procedure of determining that the manufacturing cell 12 has stopped operation when it is determined that this manufacturing machine 11 has been stopped for the predetermined time or more to wait for the signal. In other words, it is determined whether the stopped state of the manufacturing machine 11 results from execution of a waiting sequence in the task program of this manufacturing machine 11 or is the state of waiting for a signal from another manufacturing machine 11. When it takes an inordinately long time to wait for a signal, it is determined that the manufacturing cell 12 has stopped operation.

The above-mentioned stop cause identification algorithm preferably further includes, e.g., the procedure of analyzing the task program and the signal setting information for the manufacturing machine 11 at a stop to wait for a signal, as described earlier, to identify another manufacturing machine 11 that outputs a signal to be input to the manufacturing machine 11 at a stop. In this case, the other manufacturing machine 11 is assumed to be a manufacturing machine that has caused the operation stop of the manufacturing cell 12. This stop cause identification algorithm preferably further includes the procedure of analyzing the task program and the signal setting information for the other manufacturing machine 11 to identify the cause due to which the other manufacturing machine 11 outputs no signal.

The above-mentioned stop detection algorithm may even include the procedure of determining that at least one manufacturing machine 11 has an abnormality when a task program stop alarm is output from this manufacturing machine 11, and detecting the operation stop of the manufacturing cell 12. In this case, the above-mentioned stop cause identification algorithm preferably includes the procedure of identifying the manufacturing machine 11 that outputs a task program stop alarm as a manufacturing machine that has caused the operation stop of the manufacturing cell 12, and analyzing the cause of this stop from the task program and the signal setting information for this manufacturing machine 11. The task program stop alarm means a signal by which the task program itself notifies that the task program has stopped its execution.

The present invention is not limited to the algorithms exemplified above, as a matter of course.

The cell controller 13 as described above preferably includes a notification unit which notifies the external to the cell controller 13 of the manufacturing machine identified by the stop cause identification unit 23 and the analyzed cause of the stop. A display or a printer (not illustrated) connected to the cell controller 13 via the first communication unit 18 or the second communication unit 19, for example, may be used as the notification unit.

Exemplary operations of the stop detection unit 22 and the stop cause identification unit 23 of the cell controller 13 will be described below.

Figure 2:
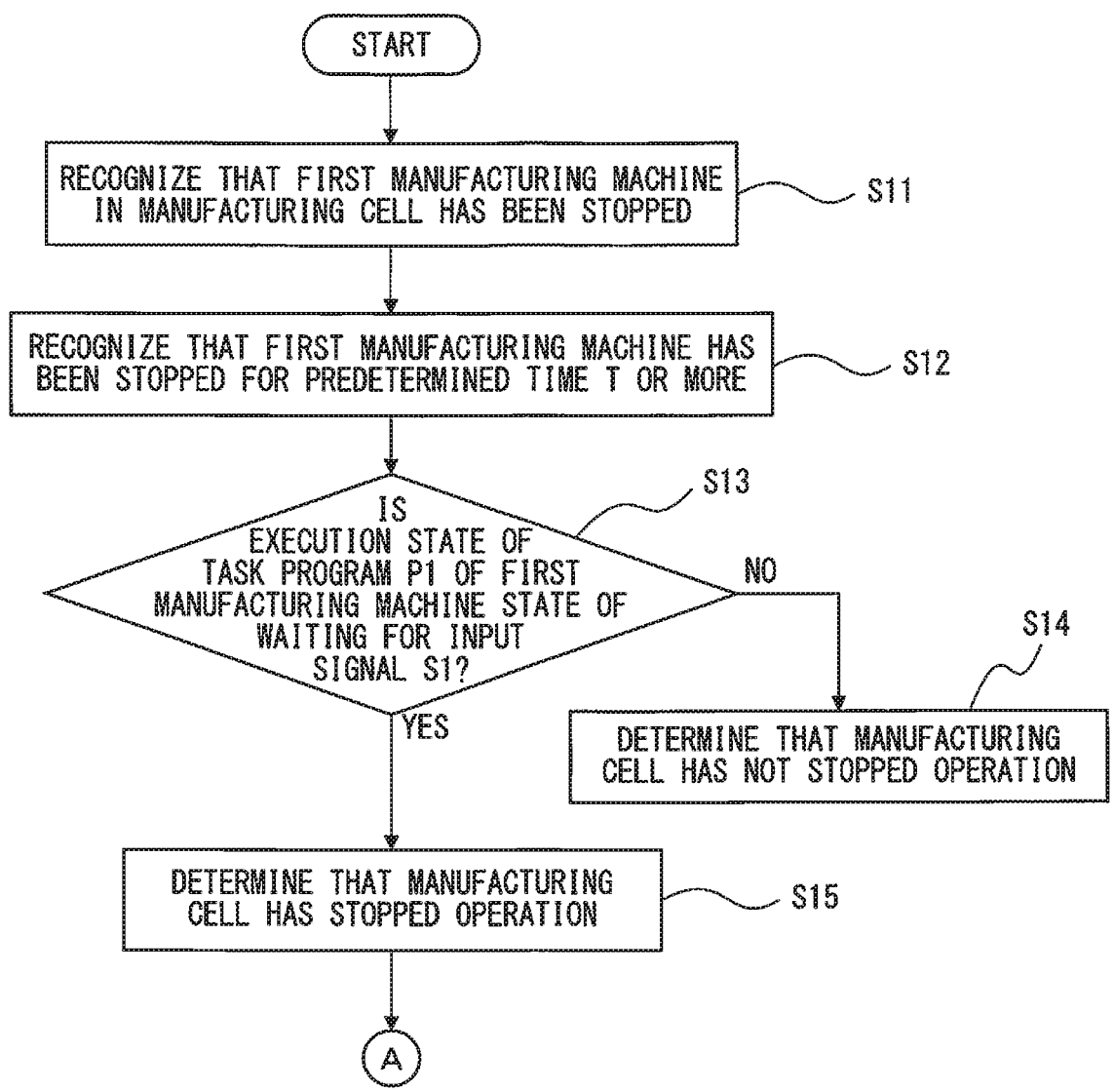
FIG. 2 is a flowchart illustrating an exemplary stop detection algorithm executed by a stop detection unit of the production controller according to the embodiment.
Figure 3:
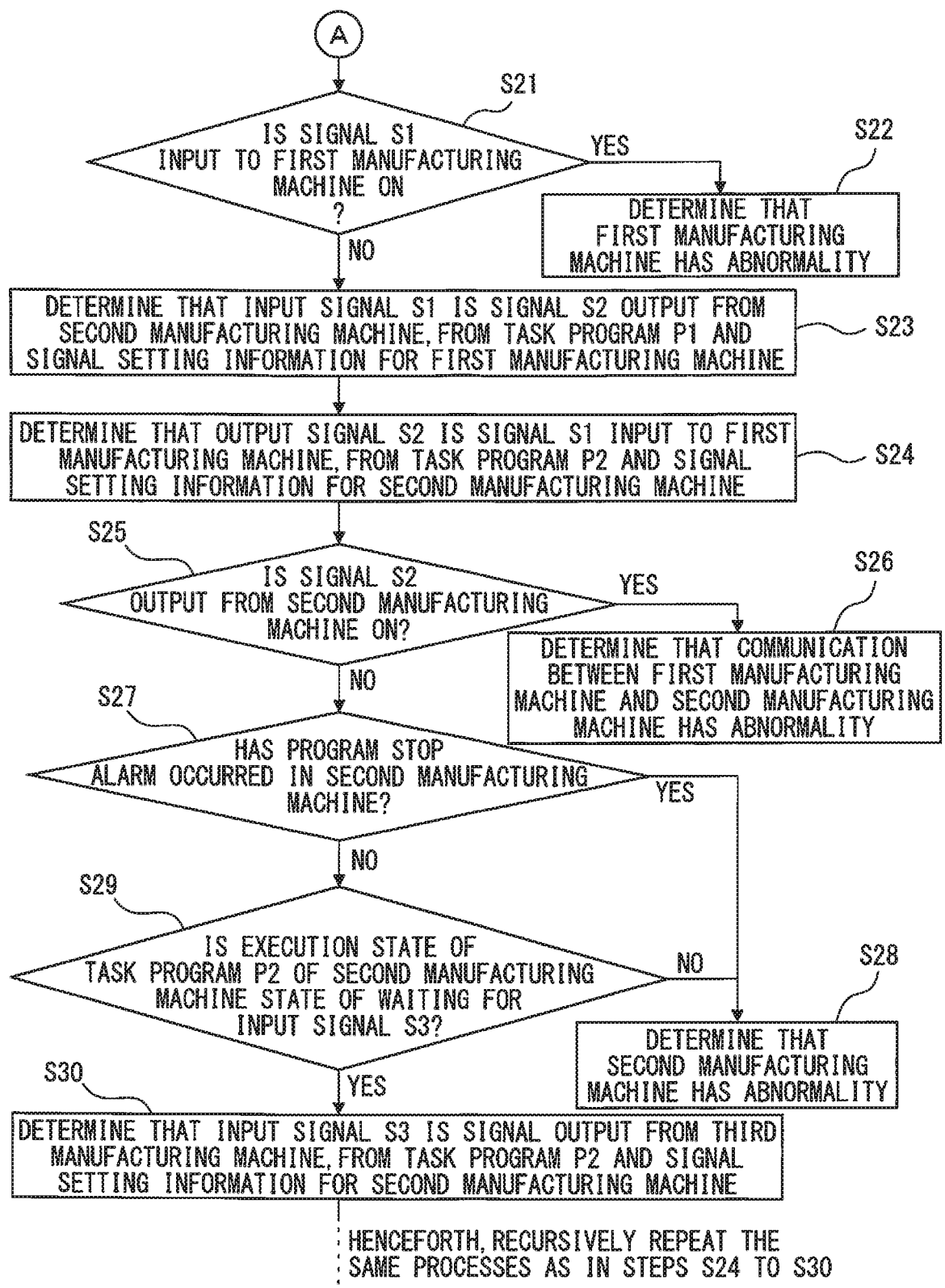
FIG. 3 is a flowchart illustrating an exemplary stop cause identification algorithm executed by a stop cause identification unit of the production controller according to the embodiment.

FIG. 2 is a flowchart illustrating an exemplary stop detection algorithm executed by the stop detection unit 22. FIG. 3 is a flowchart illustrating an exemplary stop cause identification algorithm executed by the stop cause identification unit 23. Although a stop detection algorithm and a stop cause identification algorithm are separately illustrated as FIGS. 2 and 3, respectively, these two algorithms are connected to each other by a connector A. In other words, the stop cause identification algorithm illustrated as FIG. 3 is executed subsequently to the stop detection algorithm illustrated as FIG. 2. The stop detection algorithm and the stop cause identification algorithm illustrated as FIGS. 2 and 3, respectively, are stored in the cell controller 13 before their execution. Further, in the following operations, the manufacturing cell 12 includes three manufacturing machines 11 (i.e., a first manufacturing machine 11A, a second manufacturing machine 11B, and a third manufacturing machine 11C) and the cell controller 13 performs production by controlling the three manufacturing machines 11A to 11C in the manufacturing cell 12.

First, in step S11 of FIG. 2, the cell controller 13 recognizes that the first manufacturing machine 11A of the three manufacturing machines 11A to 11C given manufacturing instructions has been stopped. This can be comprehended from information such as the state variables or the operation state and the actual production performance of each manufacturing machine 11 transmitted from this manufacturing machine 11.

Then, in step S12 of FIG. 2, the stop detection unit 22 of the cell controller 13 recognizes that the first manufacturing machine 11A has been stopped for a predetermined time T or more. When the first manufacturing machine 11A has been stopped for the predetermined time T or more, the cell controller 13 instructs the first manufacturing machine 11A at a stop to transmit a task program P1 and signal setting information in the memory 27 of the first manufacturing machine 11A to the first communication unit 18.

In step S13 of FIG. 2, the stop detection unit 22 determines whether the execution state of the task program P1 of the first manufacturing machine 11A is the state of waiting for a signal (an input signal S1) to be input from another manufacturing machine 11 to the first manufacturing machine 11A. In other words, the stop detection unit 22 refers to the task program P1 and the signal setting information for the first manufacturing machine 11A at a stop to determine whether the first manufacturing machine 11A has been stopped to wait for a signal from another manufacturing machine 11.

When it is determined in step S13 that the execution state of the task program P1 of the first manufacturing machine 11A is not the state of waiting for the signal S1 input to the first manufacturing machine 11A, the stop detection unit 22 determines that the manufacturing cell 12 has not stopped operation (step S14 in FIG. 2).

When it is determined in step S13 that the execution state of the task program P1 of the first manufacturing machine 11A is the state of waiting for the signal S1 input to the first manufacturing machine 11A, the stop detection unit 22 determines that the manufacturing cell 12 has stopped operation (step S15 in FIG. 2). When it is determined that the manufacturing cell 12 has stopped operation, the process in step S21 of FIG. 3 is performed.

In step S21 of FIG. 3, the stop cause identification unit 23 analyzes the task program P1 and the signal setting information for the first manufacturing machine 11A to determine whether the signal S1 input to the first manufacturing machine 11A is ON.

When it is determined in step S21 that the signal S1 input to the first manufacturing machine 11A is ON, the stop cause identification unit 23 determines that the first manufacturing machine 11A has an abnormality (step S22 in FIG. 3).

When it is determined in step S21 that the signal S1 input to the first manufacturing machine 11A is not ON, the process in step S23 of FIG. 3 is performed.

In step S23 of FIG. 3, the stop cause identification unit 23 analyzes the task program P1 and the signal setting information for the first manufacturing machine 11A to determine that the signal S1 input to the first manufacturing machine 11A is a signal (an output signal S2) to be output from the second manufacturing machine 11B in the manufacturing cell 12. Thus, since the manufacturing machine that transmits the signal S1 input to the first manufacturing machine 11A is determined as the second manufacturing machine 11B, the manufacturing machine that has caused the stopped state of the first manufacturing machine 11A is identified as the second manufacturing machine 11B.

In step S24 of FIG. 3, the stop cause identification unit 23 further analyzes a task program P2 and signal setting information for the second manufacturing machine 11B to determine that the signal S2 output from the second manufacturing machine 11B is the signal S1 input to the first manufacturing machine 11A.

In step S25 of FIG. 3, the stop cause identification unit 23 analyzes the task program P2 and the signal setting information for the second manufacturing machine 11B to determine whether the signal S2 output from the second manufacturing machine 11B is ON. In other words, it is determined whether the second manufacturing machine 11B generates an output signal S2 to be sent to the first manufacturing machine 11A.

When it is determined in step S25 that the signal S2 output from the second manufacturing machine 11B is ON, the stop cause identification unit 23 determines that the state of communication between the first manufacturing machine 11A and the second manufacturing machine 11B has an abnormality (step S26 in FIG. 3).

When it is determined in step S25 that the signal S2 output from the second manufacturing machine 11B is not ON, the process in step S27 of FIG. 3 is performed to search for the cause due to which the second manufacturing machine 11B transmits no output signal S2 to the first manufacturing machine 11A.

In step S27 of FIG. 3, the stop cause identification unit 23 analyzes the task program P2 and the signal setting information for the second manufacturing machine 11B to determine whether a program stop alarm has occurred in the execution state of the task program P2.

When it is determined in step S27 that a program stop alarm has occurred, the stop cause identification unit 23 determines that the second manufacturing machine 11B has an abnormality (step S28 in FIG. 3).

When it is determined in step S27 that no program stop alarm has occurred, the process in step S29 of FIG. 3 is performed.

In step S29 of FIG. 3, the stop cause identification unit 23 determines whether the execution state of the task program P2 of the second manufacturing machine 11B is the state of waiting for a signal (an input signal S3) to be input from another manufacturing machine 11 to the second manufacturing machine 11B. In other words, the stop cause identification unit 23 refers to the task program P2 and the signal setting information for the second manufacturing machine 11B that transmits no output signal S2, to determine whether the second manufacturing machine 11B has been stopped to wait for a signal from another manufacturing machine 11.

When it is determined in step S29 that the execution state of the task program P2 of the second manufacturing machine 11B is not the state of waiting for the signal S3 input to the second manufacturing machine 11B, the stop cause identification unit 23 determines that the second manufacturing machine 11B has an abnormality (step S28 in FIG. 3).

When it is determined in step S29 that the execution state of the task program P2 of the second manufacturing machine 11B is the state of waiting for the signal S3 input to the second manufacturing machine 11B, the process in step S30 of FIG. 3 is performed.

In step S30 of FIG. 3, the stop cause identification unit 23 analyzes the task program P2 and the signal setting information for the second manufacturing machine 11B to determine that the signal S3 input to the second manufacturing machine 11B is a signal to be output from the third manufacturing machine 11C in the manufacturing cell 12. Thus, since the manufacturing machine that transmits the signal S3 input to the second manufacturing machine 11B is determined as the third manufacturing machine 11C, the manufacturing machine that has caused the signal waiting state of the second manufacturing machine 11B is identified as the third manufacturing machine 11C.

The cause due to which the third manufacturing machine 11C transmits no output signal S3 to the second manufacturing machine 11B is preferably further identified by executing the same procedure as in steps S24 to S30, although details are not illustrated in the drawings.

Even for a manufacturing cell 12 including four or more manufacturing machines 11, it is preferable to recursively repeat the procedure of, when a given manufacturing machine is in wait for an input signal, identifying the manufacturing machine that transmits a signal input to the given manufacturing machine while identifying the cause due to which the identified manufacturing machine transmits no signal.

As described above, with the cell controller 13 according to the present embodiment, when at least one of the manufacturing machines 11 has been stopped for a predetermined time or more in the manufacturing cell 12 that produces an article by the manufacturing machines 11 related mutually, a task program and signal setting information are acquired from each manufacturing machine 11 and referred to and analyzed. This can detect whether the manufacturing cell 12 has stopped operation and identify the manufacturing machine that has caused this operation stop, and this cause.

The above-described stop detection algorithm and stop cause identification algorithm are merely examples, and the present invention is not limited to such specific examples.

Although the present invention has been described above with use of a typical embodiment, it can be understood by those skilled in the art that various other changes, omissions, and additions may be made in the above-described embodiment without departing from the scope of the present disclosure.

ADVANTAGEOUS EFFECTS OF INVENTION

According to an aspect of the present disclosure, it is possible to detect the operation stop of a production facility including manufacturing machines and automatically identify the manufacturing machine that has caused this operation stop, and this cause.

According to another aspect of the present disclosure, it is possible to update, as appropriate, a stop detection algorithm for detecting whether a production facility has stopped operation, and a stop cause identification algorithm for identifying the manufacturing machine that has caused the operation stop of the production facility, and this cause.

The invention claimed is:

1. A production controller which produces an article by controlling manufacturing machines forming a production facility, in accordance with production planning made by a production management system, each of the manufacturing machines storing at least a task program comprising a command for a task operation mutually related between the manufacturing machines and storing setting information of a signal exchanged between the manufacturing machines as input and output in the task operation, and the production controller comprising:
a first communication unit which is configured to exchange arbitrary information with each of the manufacturing machines via a first communication network and receives the task program and the setting information of the signal stored in each of the manufacturing machines from each of the manufacturing machines;
a stop detection unit which refers to the task program and the setting information of the signal received from each of the manufacturing machines to detect whether the production facility has stopped operation; and
a stop cause identification unit which analyzes the task program and the setting information of the signal received from each of the manufacturing machines to identify the manufacturing machine that has caused an operation stop of the production facility, and the cause, wherein
the stop detection unit is configured to execute a stop detection algorithm for referring to the task program and the setting information of the signal for at least one manufacturing machine of the manufacturing machines when the at least one manufacturing machine has been stopped for not less than a predetermined time, to determine whether the at least one manufacturing machine has been stopped to wait for a signal from another manufacturing machine of the manufacturing machines, and determining that the production facility has stopped operation when it is determined that the at least one manufacturing machine has been stopped for not less than the predetermined time to wait for the signal.

2. The production controller according to claim 1, wherein the stop cause identification unit is configured to execute a stop cause identification algorithm for analyzing the task program and the setting information of the signal received from each of the manufacturing machines when the stop detection unit determines that the production facility has stopped operation, to identify the manufacturing machine that has caused an operation stop of the production facility, and the cause.

3. The production controller according to claim 2, wherein
the production management system comprises a storage unit which stores the stop detection algorithm and the stop cause identification algorithm, and
the production controller further comprises a second communication unit which is configured to exchange arbitrary information with the production management system via a second communication network and receives the stop detection algorithm and the stop cause identification algorithm stored in the storage unit from the production management system via the second communication network.

4. A production controller which produces an article by controlling manufacturing machines forming a production facility, in accordance with production planning made by a production management system,
each of the manufacturing machines storing at least a task program comprising a command for a task operation mutually related between the manufacturing machines and storing setting information of a signal exchanged between the manufacturing machines as input and output in the task operation, and
the production controller comprising:
a first communication unit which is configured to exchange arbitrary information with each of the manufacturing machines via a first communication network and receives the task program and the setting information of the signal stored in each of the manufacturing machines from each of the manufacturing machines;
a stop detection unit which refers to the task program and the setting information of the signal received from each of the manufacturing machines to detect whether the production facility has stopped operation; and
a stop cause identification unit which analyzes the task program and the setting information of the signal received from each of the manufacturing machines to identify the manufacturing machine that has caused an operation stop of the production facility, and the cause, wherein
the stop detection unit is configured to execute a stop detection algorithm for referring to the task program and the setting information of the signal for a first manufacturing machine of the manufacturing machines when the first manufacturing machine has been stopped for not less than a predetermined time, to determine whether the first manufacturing machine has been stopped to wait for a signal from another manufacturing machine of the manufacturing machines, and determining that the production facility has stopped operation when it is determined that the first manufacturing machine has been stopped for not less than the predetermined time to wait for the signal.

5. The production controller according to claim 4, wherein
the stop cause identification unit is configured to execute a stop cause identification algorithm for analyzing the task program and the setting information of the signal for the first manufacturing machine when the stop detection unit determines that the production facility has stopped operation, to identify a second manufacturing machine serving as another manufacturing machine of the manufacturing machines that outputs a signal to be input to the first manufacturing machine, and analyzing the task program and the setting information of the signal for the second manufacturing machine to identify a cause due to which the second manufacturing machine outputs no signal.

6. The production controller according to claim 5, wherein
the stop cause identification algorithm repeats analyzing the task program and the setting information of the signal for the second manufacturing machine waiting for a signal when the cause due to which the second manufacturing machine outputs no signal is waiting for the signal, to identify another manufacturing machine of the manufacturing machines that outputs a signal to be input to the second manufacturing machine waiting for the signal, and analyzing the task program and the setting information of the signal for the other manufacturing machine to identify a cause due to which the other manufacturing machine outputs no signal.

* * * * *